United States Patent
Bergler et al.

(10) Patent No.: US 8,362,825 B2
(45) Date of Patent: Jan. 29, 2013

(54) SUB-STAGE FOR A CHARGE PUMP

(75) Inventors: Ewald Bergler, Thannhausen (AT);
Roland Brandl, Eggersdorf Bei Graz (AT); Robert Spindler, Graz (AT);
Robert Entner, Judendorf-Strassengel (AT)

(73) Assignee: NXP B.V., Eindhoven (NL)

( * ) Notice: Subject to any disclaimer, the term of this patent is extended or adjusted under 35 U.S.C. 154(b) by 76 days.

(21) Appl. No.: 12/972,430

(22) Filed: Dec. 18, 2010

(65) Prior Publication Data

US 2011/0316618 A1    Dec. 29, 2011

(30) Foreign Application Priority Data

Dec. 18, 2009  (EP) ..................................... 09252824

(51) Int. Cl.
*G05F 1/10* (2006.01)

(52) U.S. Cl. ....................................................... 327/536

(58) Field of Classification Search ........................ None
See application file for complete search history.

(56) References Cited

U.S. PATENT DOCUMENTS

| | | | |
|---|---|---|---|
| 4,481,566 A | 11/1984 | Hoffman et al. | |
| 6,297,687 B1 | 10/2001 | Sugimura | |
| 7,116,156 B2 * | 10/2006 | Myono et al. ................. | 327/536 |
| 7,561,866 B2 * | 7/2009 | Oliver et al. ............... | 455/343.3 |
| 2003/0122612 A1 | 7/2003 | Kawai et al. | |
| 2006/0120157 A1 | 6/2006 | Albano et al. | |

OTHER PUBLICATIONS

Extended European Search Report for Patent Appln. No. 09252824.9 (May 3, 2010).

* cited by examiner

*Primary Examiner* — Lincoln Donovan
*Assistant Examiner* — Sibin Chen

(57) ABSTRACT

A sub-stage for a charge pump includes a dc input pin, a dc output pin, a first radio frequency (rf) input pin configured to receive a first differential signal, a second rf input pin configured to receive a second differential signal, a first transistor having first, second and third terminals, a second transistor having first, second and third terminals, a first bias voltage source, and a second bias voltage source. The third terminal of the first transistor is configured to receive the second differential signal from the second rf input pin and a first offset voltage signal from the first bias voltage source. The third terminal of the second transistor is configured to receive the second differential signal from the second rf input pin and a second offset voltage signal from the second bias voltage source.

13 Claims, 4 Drawing Sheets

SUB-STAGE FOR A CHARGE PUMP

CROSS-REFERENCE TO RELATED APPLICATIONS

This application claims the priority under 35 U.S.C. §119 of European patent application no. 09252824.9, filed on Dec. 18, 2009, the contents of which are incorporated by reference herein.

The present disclosure relates to the field of sub-stages for charge pumps, and charge pumps comprising sub-stages.

A charge pump is an electronic circuit that pumps an electric charge through a sequence of capacitors. The capacitors are interconnected through control switches to produce output voltages that are higher or lower than the supply voltage of the circuit. Charge pumps are used extensively in memories and in power-management integrated circuits (ICs). Charge pump circuits are also used in passive radio-frequency identification (RFID) tags, wherein the AC voltage received by the transceiver is converted first to a DC voltage and then amplified up to a desired level.

A known type of charge pump circuit used in RFID tags is a Dickson charge pump, which uses a concatenation of diodes for the charge transfer, and capacitors for the charge storage.

The listing or discussion of a prior published document or any background in the specification should not necessarily be taken as an acknowledgement that the document or background is part of the state of the art or is common general knowledge.

According to a first aspect of the invention, there is provided a sub-stage for a charge pump having a first and second phase of operation, the sub-stage comprising:
- a dc input pin;
- a dc output pin;
- a first rf input pin configured to receive a first differential signal;
- a second rf input pin configured to receive a second differential signal;
- a first transistor having a first, second and third terminal, wherein a current channel is provided between the first and second terminal of the transistor; and
- a second transistor having a first, second and third terminal, wherein a current channel is provided between the first and second terminal of the transistor;
- wherein the first terminal of the first transistor is connected to the dc input pin, the second terminal of the first transistor is connected to the first terminal of the second transistor, and the second terminal of the second transistor is connected to the dc output pin;
- wherein the first rf input pin is coupled to the second terminal of the first transistor and the first terminal of the second transistor, such that the current channel of the second transistor conducts signalling received at the first rf input pin during the second phase of operation, and the current channel of the first transistor conducts signalling received at the first rf input pin during the first phase of operation,
- the sub-stage further comprising a first bias voltage source and a second bias voltage source;
- wherein the third terminal of the first transistor is configured to receive a second differential signal from the second rf input pin and a first offset voltage signal from the first bias voltage source; and
- the third terminal of the second transistor is configured to receive a second differential signal from the second rf input pin and a second offset voltage signal from the second bias voltage source.

Such a sub-stage can enable an efficient charge pump to be provided by utilising the first and second offset voltage signals to effectively lower the threshold voltages of the transistors experienced by the differential signals, such that less of the voltage provided by the differential signals to the third/control terminals of the transistors is wasted in satisfying the threshold voltages of the transistors and so that the current channel can be "switched on" for a larger proportion of the time that the current channel is in forward bias.

The effective threshold voltage of the transistor can be considered as being reduced when the current channel of a transistor is in forward bias so that a reduced voltage is dropped across the transistor in order to provide for conduction of the current channel, and the minimum voltage experienced at the third/control terminal can be increased when the current channel of a transistor is in reverse bias so as to reduce any leakage current of the transistor. This can reduce energy that is wasted by the transistors.

The utilisation of differential input signals can be advantageous because the second differential signal can provide the signalling that is appropriate for switching the transistors on at the desired times, and the offset voltage signals can be suitable for adjusting the effective threshold voltages of transistors in order to improve the efficiency of the charge pump.

The third terminal of the first and/or second transistor can be considered as a control terminal, such as the gate or base terminal, of the transistor. The signal received at the third terminal of the first transistor may be considered as a first current channel control signal and the signal received at the third terminal of the second transistor may be considered as a second current channel control signal.

It will be appreciated that the current channel of a transistor may conduct signalling when the voltage at its third/control terminal exceeds a threshold voltage, and not substantially conduct signalling when the voltage at its third control terminal is less than the threshold voltage.

The first and/or second bias voltage sources may be dc voltage sources. The first and/or second offset voltage signals may be substantially constant dc signals. The first and/or second bias voltage sources may be charge pumps, and may be referred to as auxiliary charge pumps. The first and second offset voltage signals generated by the first and second bias voltage sources may comprise a ripple voltage component.

The first bias voltage source may be configured to provide the first offset voltage signal having a substantially constant value that is less than the threshold value of the first transistor. The second bias voltage source may be configured to provide the second offset voltage signal having a substantially constant value that is less than the threshold value of the second transistor.

The first and/or second offset voltage signals may have a constant value that is less than the threshold voltage of the transistor with which it is associated. The constant value of the offset voltage signal may be just less than the threshold voltage. For example, for a transistor with a threshold voltage of 0.6 volts, the associated offset voltage signal may have a value of 0.5 volts.

The value of the offset voltage signal may be selected so that the summation of the offset voltage signal and the second differential rf signal is less than the threshold voltage when the second differential signal is less than zero, and the summation of the offset voltage signal and the second differential signal is greater than the threshold voltage for at least a period of time that the second differential signal is greater than zero, optionally the majority of the time that the second differential signal is greater than zero. In some embodiments the value of the offset voltage signal may be selected in order to increase and/or maximise the proportion of the time that the threshold voltage is exceeded when the current channel is in forward bias.

One or more embodiments described herein can be considered as increasing the amount of time that the current channel conducts during an appropriate phase of operation.

A stage of the charge pump may comprise a first sub-stage as disclosed above, and a second sub-stage having similar components to the first sub-stage, whereby the first rf input pin of the second sub-stage is configured to receive the second differential signal, and the second rf input pin of the second sub-stage is configured to receive the first differential signal.

For such a second stage, the first differential signal can provide the required signalling, or at least signalling that can exceed the threshold voltage of the transistor when its current channel is to conduct the second differential signal.

It will be appreciated that a transistor has a current channel between its collector and emitter, or between its source and drain, depending upon the type of transistor that is being used. As is known in the art, the current channel can be under forward bias whereby the current channel can conduct, or the current channel can be under reverse bias whereby the current channel does not significantly conduct. The current channel of a transistor in some embodiments can be considered as a diode with a threshold voltage that is controllable in accordance with a signal received at a base/gate terminal of the transistor.

It will be appreciated that any known components or circuits can be used as one or more of the transistors disclosed herein, including metal oxide semiconductors (MOS) transistors, field effect transistors (FET's), MOSFET's, bipolar junction transistors (BJT's), transistors having a plurality of control pins and any circuits/components that can provide the required functionality in accordance with this disclosure.

The current channel of the first transistor may not significantly conduct signalling received at the first rf input pin during the second phase of operation, and the current channel of the second transistor may not significantly conduct signalling received at the first rf input pin during the first phase of operation. This can be due to the orientation of the current channels such that the current channel of the transistor is in forward bias when the current channel of the second transistor is in reverse bias, and vice versa.

It will be appreciated that any leakage current that may flow through a current channel of a transistor when the channel is in reverse bias may not be considered as the current channel "significantly" conducting.

The first and second differential signals can be radio frequency (rf) signals, which may be received as a radio frequency identification (RFID) signal. The first and second differential signals can be 180 degrees out of phase with each other, and this can be due of the symmetrical design of the charge pump.

The first phase of operation may be when signalling received at the first rf input pin is low/negative and signalling received at the second rf input pin is high/positive. The second phase of operation may be when signalling received at the first rf input pin is high/positive and signalling received at the second rf input pin is low/negative. In other examples, the first and second phases of operation may be reversed.

The first transistor may be an n-type field effect transistor. The second transistor may be a p-type field effect transistor. Such transistors may be a convenient way to implement the current channels of the transistors having the desired forward and reverse bias relative to the first differential signal that is receivable at the first rf input pin.

The sub-stage may further comprise a first capacitor. A first plate of the capacitor may be coupled to the rf input pin and a second plate of the capacitor may be coupled to the second terminal of the first transistor and the first terminal of the second transistor. The first capacitor can store charge provided by a dc output pin of an earlier sub-stage (which may be referred to a lower dc level) during the first phase of operation, and release that charge during the second phase of operation to the dc output pin, which can be considered as providing a higher dc level.

The sub-stage may further comprise a second capacitor connected between the dc output pin and any dc node in the circuit. The dc node may be a dc output pin from an earlier sub-stage or may be a ground pin. The ground pin may be a virtual ground pin. The second capacitor can be used to smooth an output voltage that is provided on the dc output pin by storing charge during the second phase of operation and releasing that charge to the dc output pin during the first phase of operation.

The dc input pin may be configured for connecting to a dc output pin of a preceding sub-stage if there is one, or may be configured for connecting to a (virtual) ground pin if there is no preceding sub-stage. The dc output pin may be configured for connecting to a dc input pin of a next sub-stage if there is one, or may be configured for connecting to a charge pump output pin if there is no next sub-stage. In this way, a plurality of sub-stages can be provided in series to generate a required output voltage.

According to a further aspect of the invention, there is provided a charge pump having a first and second phase of operation, the charge pump comprising:
  a first rf input pin configured to receive a first differential signal;
  a second rf input pin configured to receive a second differential signal;
  an output pin;
  a plurality of stages, each stage comprising:
    a first sub-stage and a second sub-stage,
    the first sub-stage comprising:
      a first dc input pin;
      a first dc output pin;
      a first transistor having a first, second and third terminal, wherein a current channel is provided between the first and second terminal of the transistor; and
      a second transistor having a first, second and third terminal, wherein a current channel is provided between the first and second terminal of the transistor;
    wherein the first terminal of the first transistor is connected to the first dc input pin, the second terminal of the first transistor is connected to the first terminal of the second transistor, and the second terminal of the second transistor is connected to the first dc output pin;
    wherein the first rf input pin is coupled to the second terminal of the first transistor and the first terminal of the second transistor, such that the current channel of the first transistor conducts signalling received at the first rf input pin during the first phase of operation, and the current channel of the second transistor conducts signalling received at the first rf input pin during the second phase of operation,
    the first sub-stage further comprising a first bias voltage source and a second bias voltage source;
    wherein the third terminal of the first transistor is configured to receive a second differential signal from the second rf input pin and a first offset voltage signal from the first bias voltage source; and the third terminal of the second transistor is configured to receive a second differential signal from the second rf input pin and a second offset voltage signal from the second bias voltage source;

the second sub-stage comprising:
a second dc input pin;
a second dc output pin;
a third transistor having a first, second and third terminal, wherein a current channel is provided between the first and second terminal of the transistor; and
a fourth transistor having a first, second and third terminal, wherein a current channel is provided between the first and second terminal of the transistor;
wherein the first terminal of the third transistor is connected to the second dc input pin, the second terminal of the third transistor is connected to the first terminal of the fourth transistor, and the second terminal of the fourth transistor is connected to the second dc output pin;
wherein the second rf input pin is coupled to the second terminal of the third transistor and the first terminal of the fourth transistor, such that the current channel of the third transistor conducts signalling received at the second rf input pin during the second phase of operation, and the current channel of the fourth transistor conducts signalling received at the second rf input pin during the first phase of operation,
the second sub-stage further comprising a third bias voltage source and a fourth bias voltage source;
wherein the third terminal of the third transistor is configured to receive a first differential signal from the first rf input pin and a third offset voltage signal from the third bias voltage source; and
the third terminal of the fourth transistor is configured to receive a first differential signal from the first rf input pin and a fourth offset voltage signal from the fourth bias voltage source;
wherein:
the dc input pins of the first and second sub-stages of a first stage are connected to ground,
the dc output pins of the first and second sub-stages of a last stage are connected to the output pin, and
the dc output pins of the first and second sub-stages of any other stages are connected to the dc input pins of the first and second sub-stages of the next stage.

In some embodiments it may be desirable to couple the dc output pins of the first and second sub-stages together to provide a common dc output pin for the stage. The common dc output pin can be connectable to both the dc input pin of the first sub-stage and the dc input pin of the second sub-stages of the next stage.

In other embodiments the common dc output pin may be connected to a common dc input pin of the next stage, whereby the common dc input pin is internally connected to both the dc input pins of the first and second sub-stages of the next stage. In this way, a common signal can be provided from the dc output pins of the first and second sub-stages of the present stage to the dc input pins of the first and second sub-stages of the next stage.

In other embodiments, it may not be necessary to couple the dc output pins of the first and second sub-stages for a given stage, and the dc output pin of the first sub-stage can be connected to the dc input pin of one of the sub-stages of the next stage, and the dc output pin of the second sub-stage can be connected to the dc input pin of the other sub-stage of the next stage.

There may be provided a virtual ground. The virtual ground may be considered as being provided between the first and second sub-stages of each stage, whereby the symmetry of the components in the first and second sub-stages contributes to the existence of the virtual ground. The dc input pins of the sub-stages of the first stage may be coupled to the virtual ground. There may also be provided a second/buffer capacitor coupled between the dc output pins of the sub-stages and virtual ground.

The first and third transistors may be n-type MOSFETs. The second and fourth transistors may be p-type MOSFETs.

There may be provided a radio frequency identification (RFID) device comprising any sub-stage or charge pump disclosed herein. The RFID device may be a tag, and may be a passive RFID tag.

The RFID device may be configured to operate at ultra high frequencies (UHF), and the sub-stage or charge pump may be configured to receive UHF differential signals.

A description is now given, by way of example only, with reference to the accompanying drawings, in which.

One or more embodiments of the invention described herein relate to a charge pump that is configured to receive two differential input signals. The charge pump can include a plurality of stages, each of the stages including a first and second sub-stage, and a "virtual ground" located between the two sub-stages. Furthermore, the sub-stages include two transistors, each having a third/control terminal that requires a threshold voltage to be exceeded before a current channel of the transistor can conduct one of the differential input signals. The other of the differential input signals is provided to the third/control terminal in order to switch on the current as required.

Associated with one or more of the transistors is a bias voltage source that is configured to provide the third/control terminal of the transistor with a dc offset voltage so as to effectively reduce the threshold voltage of the transistor and enable the current channel of the transistor to more efficiently conduct when it is in forward bias.

Advantages associated with embodiments of the invention can include a charge pump with improved efficiency over those known in the art, and this may be due to a reduction in the voltage that is dropped across a transistor when the channel is conducting, and a decrease in the leakage current when the transistor channel is not significantly conducting. Such transistor control can be advantageously and conveniently achieved using the differential input signals. For example, one of the two differential input signals is passed through the current channel of a transistor, and the other is used in combination with the offset voltage to switch the transistor on when it should be conducting.

Figure 1:
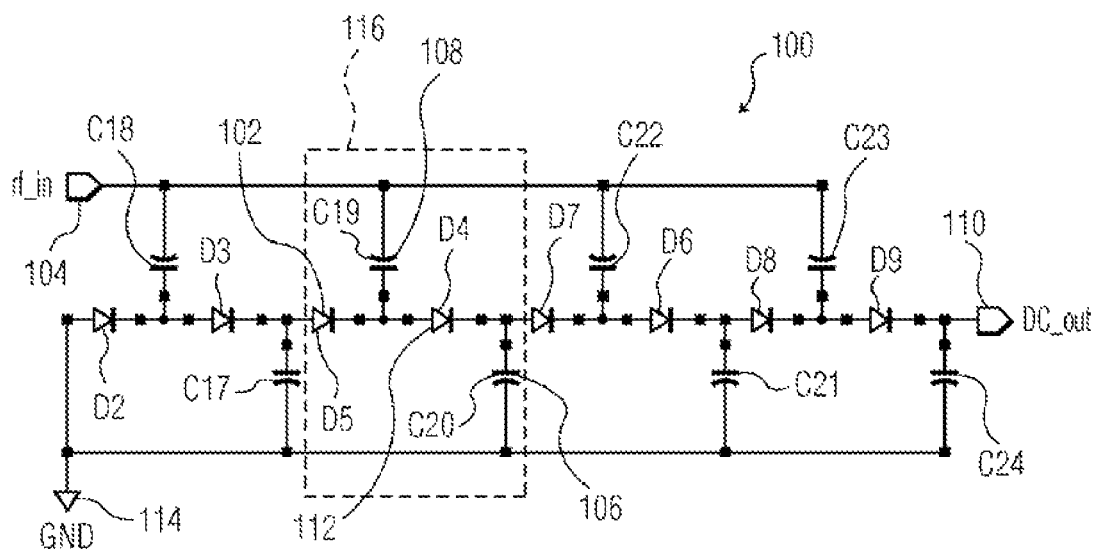
FIG. 1 shows a prior art Dickson charge pump.

FIG. 1 illustrates a prior art Dickson charge pump 100. The Dickson charge pump 100 consists of a plurality of stages 116 in series between an input pin 104 and an output pin 110. Each stage comprising a first diode 102 and a second diode 112 connected in series between an input pin of the stage 116 and an output pin of the stage 116. A first capacitor 106 is connected between the output of the second diode 112 and a ground pin 114. A second capacitor 108 is connected between the output of the first diode 102 and a radio frequency (rf) input pin 104.

As is known in the art, charge is "pumped" through the circuit 100 such that a dc voltage can be accumulated at each stage 116 and added together to provide a dc output voltage at the output pin 110.

Each diode 102, 112 requires a threshold voltage to be exceeded in order to operate in forward bias, and the threshold voltage may be of the order of 0.5 volts. As a practical example, suppose a Dickson charge pump 100 receives an input rf signal with an amplitude of 0.6 volts. This means that each stage 116 of the Dickson charge pump 100 can only be used to provide a dc output voltage when the amplitude of the input rf input signal is in excess of 0.5 volts. Therefore, in order to obtain an output signal of 0.6 volts, which may be required to supply any subsequent processing, at least a six stage Dickson charge pump is required. In some examples, up to thirty-six stages 116 may be required to generate a required output signal.

It will be appreciated that dropping such a large proportion of the received rf input voltage across each of the diodes 102, 112 can lead to an inefficient circuit 100.

Figure 2A:
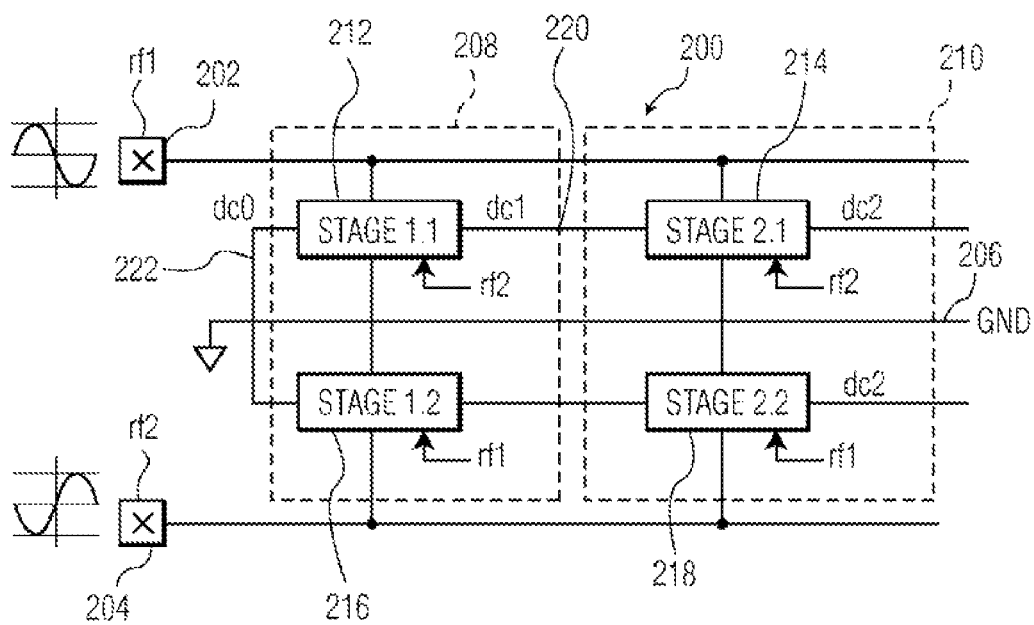
FIGS. 2a and 2b illustrate schematically charge pumps according to embodiments of the invention.

FIG. 2a illustrates a charge pump circuit 200 according to an embodiment of the invention.

In this example, the charge pump circuit 200 is configured for use with passive radio frequency identification (RFID) devices/tags. The tags can be small silicon integrated circuits (ICs) that are mounted on an antenna, and can be used to identify an associated object. One or more embodiments described herein can be used with AC input signals in the ultra high frequency (UHF) range, for example of the order of 900 MHz. The charge pump circuit 200 of FIG. 2a is configured to rectify the received UHF signal, and amplify the voltages to ensure that a sufficiently high output voltage is provided for subsequent processing.

As the charge pump circuit 200 of this example is configured for use with a passive RFID tag, an improvement in energy conversion efficiency can be particularly advantageous as available power can be limited.

The charge pump circuit 200 comprises a first rf input pin 202 and a second rf input pin 204. The first and second input pins 202, 204 are configured to receive differential input signalling such as that derived from a UHF rf signal as described above.

The first input pin 202 can be considered as receiving a first input signal rf1, which is illustrated in FIG. 2a as a sine waveform starting with zero amplitude and initially rising. The second input pin 204 can be considered as receiving a second differential signal rf2, and is represented graphically in FIG. 2a as a sine waveform starting at zero amplitude and initially falling. It will be appreciated by the skilled person that the first and second differential signals rf1, rf2 are 180° out of phase with each other due to the symmetry of the charge pump 200.

Both the first and second input pins 202, 204 may be connected directly or indirectly to the same antenna, and/or may be received as differential chip inputs.

The charge pump circuit 200 of FIG. 2a consists of a first stage 208 and a second stage 210. It will be appreciated that in other embodiments, any number of stages, including only one stage or more than two stages, can be provided. The number of stages can be selected so that a desired output voltage can be achieved whereby each stage contributes to the final output voltage. The final output voltage is provided by the dc output pins (dc2) of the last stage.

Each of the stages 208, 210 consists of a first sub-stage 212, 214 and a second sub-stage 216, 218, wherein each sub-stage has a dc input pin and a dc output pin.

As will be described in more detail, a virtual ground 206 is provided between the first and second sub-stages because the first sub-stage 212, 214 is symmetrical with the second sub-stage 216, 218. It will be appreciated that the differential input signals rf1, rf2 are 180° out of phase with each other, when being considered as relative to the virtual ground 206.

The charge pump circuit 200 has two phases of operation; a first phase of operation when the amplitude of the first differential signal rf1 is negative and the amplitude of the second differential signal rf2 is positive; and a second phase of operation when the amplitude of the first differential input signal rf1 is positive and the amplitude of the second differential input signal rf2 is negative. As is known with conventional Dickson charge pumps, different components are configured to conduct during different phases of the received signalling as some components are in forward bias and some are in reverse bias.

Taking the first stage 208 as an example, the first sub-stage 212 is configured to receive both the first differential input signal rf1 and the second differential input signal rf2. The first differential input signal rf1 contributes to the output signal dc1 220 of the first sub-stage 212 when the first differential input signal rf1 is positive, and the second differential input signal rf2 is used to apply an alternating voltage (ac) to the gate/base terminals of transistors within the first sub-stage 212 in order to "switch on" the current channels of the transistor in accordance with the phase of operation of the charge pump circuit 200. In addition, a constant bias voltage (dc) is also applied to the gate/base terminals of transistors, and in this way, the effective threshold voltage of the transistor can be adjusted in as much as the requirement for the threshold voltage of the transistor to be met by the alternating voltage (ac) is reduced. The combination of the second differential input signal rf2 and the constant bias voltage can be considered as a current channel control signal. Adjusting the effective threshold voltages of transistors can include reducing the effective threshold voltage when the channel of the transistor is in forward bias, and vice versa.

The second sub-stage 216 of the first stage 208 of the charge pump circuit 200 is configured in a similar way to the first sub-stage 212, but with the input signals reversed.

Figure 2B:
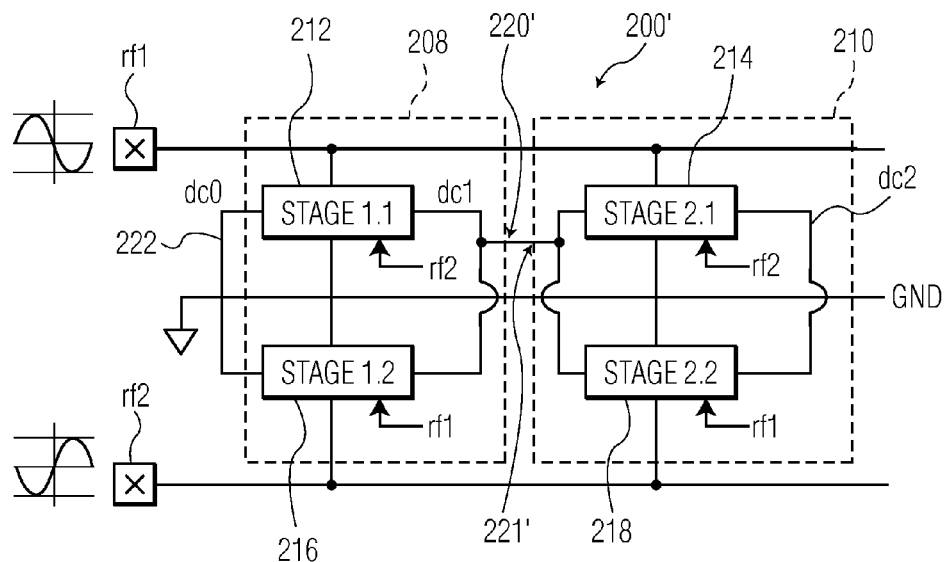

FIG. 2b illustrates a charge pump 200' according to a further embodiment of the invention. The charge pump 200' of FIG. 2b is similar to the charge pump 200 of FIG. 2a, and similar components have been given the same reference numbers.

The dc output pins of the first sub-stage 212 and the second sub-stage 216 of the first stage are coupled together and provided as a common (single) dc output pin 220' in the embodiment of FIG. 2b. It will be appreciated that this is different to the charge pump 200 of FIG. 2a, where a first dc output pin from the first sub-stage 212 and a second dc output pin from the second sub-stage 214 are provided as separate output pins of the first stage 208.

Similarly, the dc input pins of the first sub-stage 214 and second sub-stage 218 of the second stage 210 are coupled together to provide a common (single) dc input pin 221' of the second stage 210.

Figure 3:
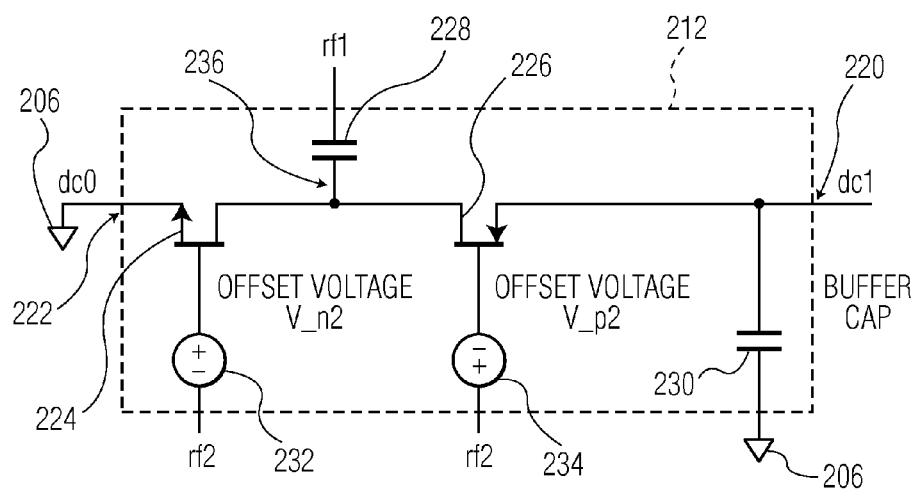
FIG. 3 illustrates schematically a circuit diagram of a sub-stage of the charge pump of FIG. 2.

FIG. 3 illustrates an example circuit diagram for a sub-stage of a charge pump circuit according to an embodiment of the invention. The sub-stage shown as FIG. 3 represents an example of the first sub-stage 212 of the first stage 208 of the charge pump circuit 200 of FIG. 2a.

As the sub-stage 212 that is illustrated in FIG. 3 is part of the first stage of the charge pump circuit, the dc input pin 222 that is labelled dc0 is connected to virtual ground 206. The dc output pin 220 that generates the signal labelled dc1 is provided as the output of the sub-stage 212, and can be connected as an input to a next stage as illustrated in FIG. 2a or FIG. 2b. This is shown in FIG. 2a where the dc output 220 of the first sub-stage 212 of the first stage 208 is provided as the dc input to the first sub-stage 214 of the second stage 210. Similarly, it can be seen from FIG. 2a that the dc output of the second sub-stage of the first stage is provided as the dc input to the second sub-stage of the second stage.

Connected between the dc input pin 222 and the dc output pin 220 of the sub-stage 212 shown in FIG. 3 are the current channels of two field effect transistors (FETs) 224, 226 in series. The first FET 224 is an n-type MOSFET, and the second transistor 226 is a p-type MOSFET. In this example, the drain of the first FET 224 is connected to dc input pin 206, the source of the first FET 224 is connected to the drain of the second FET 226, and the source of the second FET 226 is connected to the dc output pin 220. It will be appreciated that the two FETs 224, 226 can perform similar functionality to the diodes of the prior art Dickson charge pump that is illustrated in FIG. 1.

A first plate of a first capacitor 228 is connected to the junction 236 between the source of the first FET 224 and the drain of the second FET 226. The second plate of the first capacitor 228 is connected to the first rf input pin 202 in order to receive the first differential input signal rf1.

A second capacitor 230, which may be known as a buffer capacitor, is connected between the dc output pin 220 and virtual ground 206. In other embodiments, it will be appreciated that the second capacitor 230 may be connected between the dc output pin 220 and any stable dc node and still perform the required functionality of charging and discharging during the different phases of operation. An example of a suitable dc node may be the dc output pin of an earlier stage/sub-stage in the charge pump if there is one.

Figure 4:
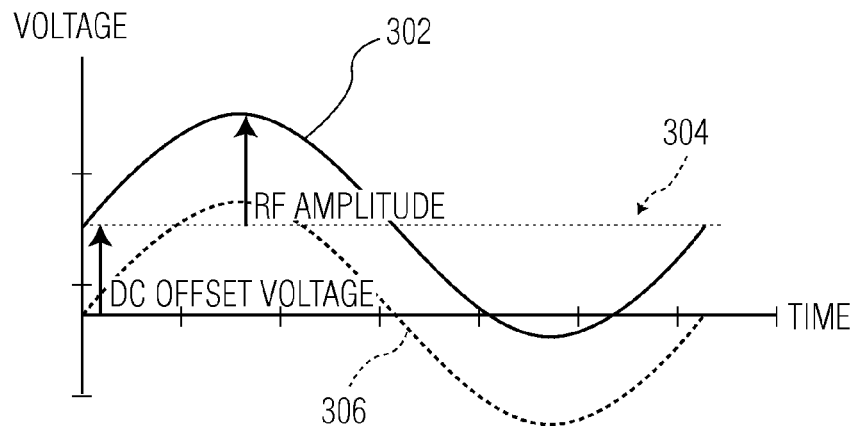
FIG. 4 illustrates a current channel control signal that can be used by an embodiment of the invention.

A first offset voltage component 232 is connected to the gate of the first FET 224. The first offset voltage component 232 is configured to generate a substantially constant dc offset/bias voltage. The gate of the first FET 224 receives the offset voltage from the first offset voltage component 232 and the second differential input signal rf2 from the second rf input pin 204, which together may be referred to as a current channel control signal. The current channel control signal 302 comprises an alternating (rf) component and a constant (dc) component as shown in FIG. 4. As will be described below, the current channel control signal 302 comprises a constant (dc) component 304 that is provided by the offset voltage component 232 to provide a dc offset voltage. In addition, the current channel control signal comprises an rf (ac) component 306 that is received from the second rf input pin (rf2).

Using the dc offset voltage can effectively control the degree to which the second differential input signal rf2 needs to contribute to satisfying the threshold voltage required at the gate in order for the current channel of the FET 224 to conduct. This can be considered as effectively lowering the threshold voltage of the FET 224. The threshold voltage is effectively reduced when the current channel of the FET 224 is in forward bias and conducting the first differential input signal rf1 because the second differential input signal rf2 can more easily exceed the threshold voltage of the FET 224 due to the dc offset voltage.

Similarly, the dc offset voltage provided by the first offset voltage component 232 is configured to reduce the leakage current when the FET 224 is in reverse bias and is not conducting the first differential signal rf1. This is because the alternating component of the current channel control signal, which is provided by the second differential input signal rf2, may not fall to as low a value as with the prior art due to the dc offset voltage. It has been appreciated that the second differential input signal rf2 in combination with a dc offset signal is suitable for providing to the gate of the FET 242 because the second differential input signal rf2 causes the current channel of the FET 242 to more efficiently conduct at the intended times.

A second offset voltage component 234 is connected to the gate of the second FET 226 in combination with the second differential signal in order to provide a current channel control signal in a similar fashion to the functionality of the current channel control signal as described in relation to the first FET 224. It will be appreciated that the second offset voltage component 234 has the opposite polarity to the first offset voltage component 232 as it is provided for operation with a p-type FET 226 as opposed to an n-type FET 224.

The dc offset voltage signals provided by the first and second offset voltage components 234, 236 may have amplitudes that are close to the threshold voltage of the transistor to which they are connected. For example, if a transistor has a threshold voltage of 0.6 volts, then the offset voltage component may be configured to generate a dc offset voltage signal with an amplitude of 0.5 volts. Proper selection of the amplitude of the dc offset voltage can ensure that the current channel of the transistor only conducts when it should, without wasting unnecessary voltage from the differential input signal that is also provided to the gate of the transistor, and also that the current channel of the transistor is switched on for a larger proportion of the time that the current channel is in forward bias.

The offset voltage components 232, 234 may be known as auxiliary charge pumps, and further details of an example implementation of an auxiliary charge pump are provided below with reference to FIG. 6.

It will be appreciated that by using differential input signals rf1, rf2, the amplitude of each of the differential signals rf1, rf2 is half that of the signal received originally at the antenna. Nonetheless, due to the improved efficiencies by adjusting the effective threshold voltages of the transistors (which are examples of rectifying elements) using offset voltage components, such a circuit can provide one or more advantages as disclosed herein.

An example of how current flows through the sub-stage 212 of FIG. 3 when it is in use will now be described.

During a first phase of operation, when the first differential signal rf1 is low/negative, and the second differential signal rf2 is high/positive, the current channel of the first FET 224 is in forward bias, and therefore charges the first capacitor 228. The capacitor 228 is charged because the current channel of the second transistor 226 is in reverse bias and therefore does not provide a circuit to the dc output pin 220.

During a second phase of operation, the first differential input signal rf1 is high/positive, and the second differential input signal rf2 is low/negative. During this phase of operation, the current channel between the drain and source of the first n-type FET 224 is in reverse bias and does not significantly conduct, and can be considered as similar to the functionality of a diode in reverse bias. Any leakage current may not be considered as significant conduction. During this phase of operation, the gate source voltage of the first FET 224 should be below its threshold voltage so that the current channel cannot conduct. Due to the phase relationship between the first differential signal rf1 and the second differential input signal rf2, the instantaneous value for rf2 is always low when the instantaneous value for rf1 is high. Therefore, the second differential signal rf2 can be used to ensure that the gate source voltage of the first FET 224 is below the threshold voltage.

Also during the second phase of the differential input signal rf1, the current channel of the second p-type FET 226 is in forward bias and therefore conducts. In this way the signal received at the first differential input signal rf1 is passed to the output of the sub-stage 212 at dc output pin 220 and the charge which is stored in the device 228 is transferred to the output node 220 and stored in the buffer capacitor 230. During this phase of operation, the effective threshold voltage of the second FET 226 should be as low as possible, so that a lower voltage is dropped across the current channel of the second FET 226. In order to control the effective threshold voltage of the second FET 226, a low voltage is required at the gate of the second FET 226, as the second FET 226 is p-type (and not n-type like the first FET 224).

Figure 5A:
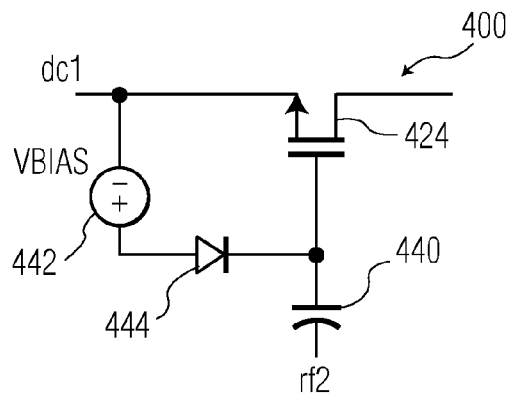
FIGS. 5a and 5b illustrate an auxiliary charge pump that can be used with embodiments of the invention.
Figure 5B:
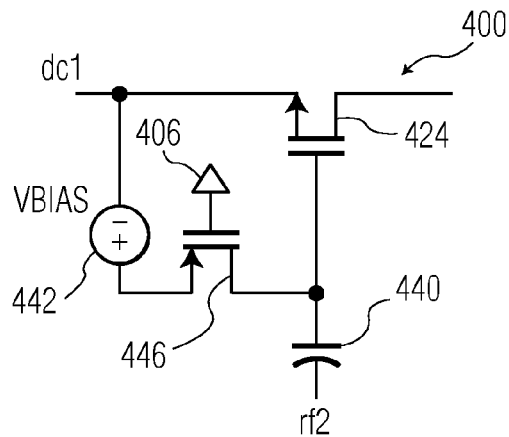

FIGS. 5*a* and 5*b* illustrate further details of how an auxiliary charge pump/bias voltage source 442 can be incorporated into a sub-stage of a charge pump according to an embodiment of the invention. FIG. 5*a* illustrates the principle behind the auxiliary charge pump, and FIG. 5*b* shows an example of a convenient implementation of how to incorporate such a charge pump 442.

FIG. 5*a* shows an n-type MOSFET 424 similar to the FET 224 shown in FIG. 3, but for the second stage 210 of the charge pump. The gate of the MOSFET 424 is connected to a first plate of a capacitor 440, and the second plate of the capacitor 440 is connected to the second differential input signal rf2. Also connected to the gate of the MOSFET 424 is the cathode of a diode 444. The anode of the diode 444 is connected to the positive terminal of the bias voltage source 442, and the negative terminal of the bias voltage source 442 is connected to dc1, which is the output from the previous stage (as can be seen from FIG. 2).

The diode 444 can ensure that the dc offset/bias voltage that is generated by the bias voltage source 442 is provided to the gate of the FET 424 along with the second differential signal rf2, and that the second differential signal rf2 is not provided to the bias voltage source 442. The bias voltage source 442 can be an auxiliary charge pump as described herein.

FIG. 5*b* illustrates an example implementation of the circuit of FIG. 5*a*, whereby the diode 444 is replaced with a p-type MOSFET 446, with the drain of the p-type MOSFET 446 being connected to the gate of the n-type MOSFET, the source of the p-type MOSFET being connected to the positive terminal of a bias voltage source 442, and the gate of the p-type MOSFET being connected to a dc node 406, such as dc1 or virtual ground. Such an implementation may be a convenient arrangement that makes efficient and economical use of silicon.

Figure 6:
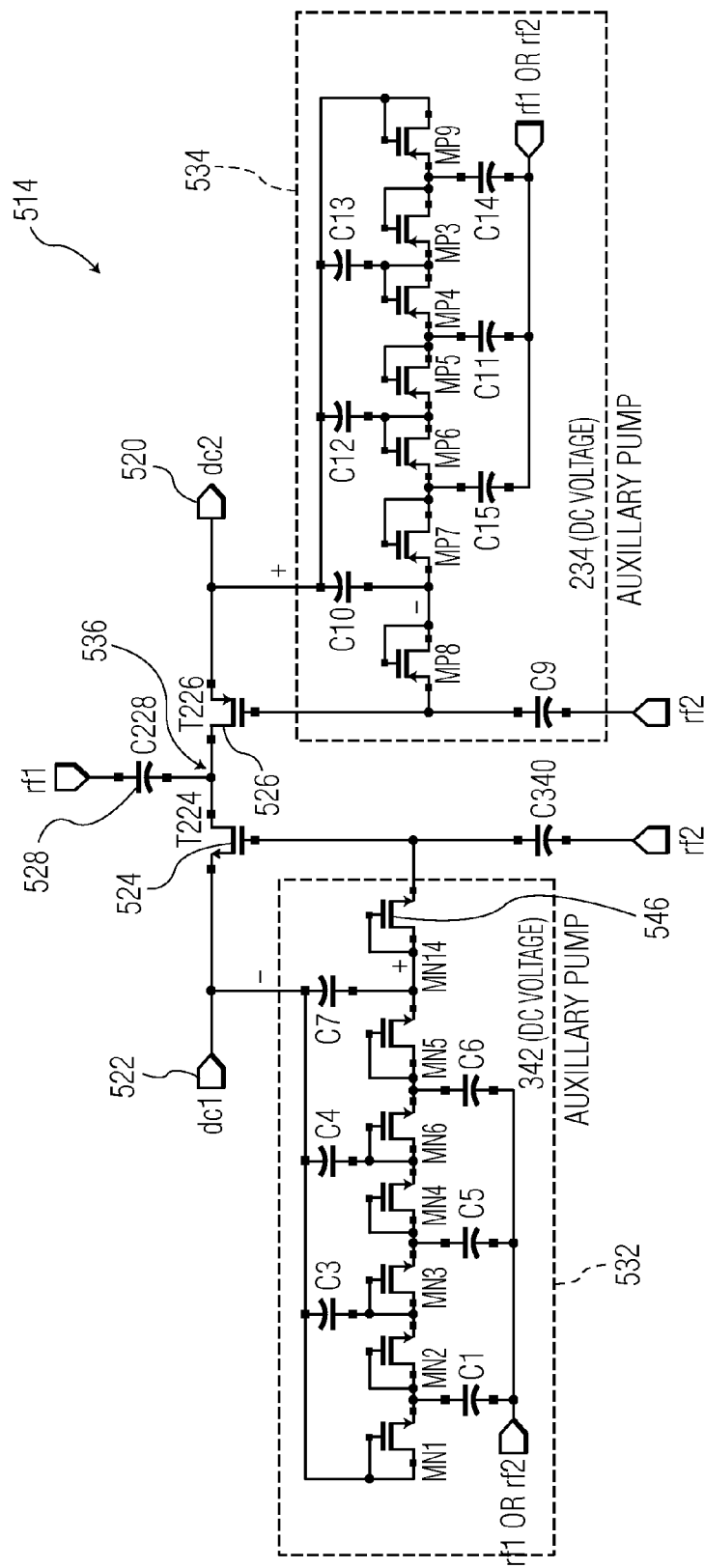
FIG. 6 illustrates schematically a circuit diagram of a sub-stage of a charge pump according to an embodiment of the invention.

FIG. 6 illustrates a circuit diagram of a sub-stage 514 of a charge pump according to an embodiment of the invention. The sub-stage 514 of FIG. 6 is an example of a first sub-stage of a second stage of a charge pump, and components of FIG. 6 that are in common with components of FIG. 3 are identified with corresponding reference numbers in the 500 series.

The auxiliary charge pump/bias voltage source 532 for the first FET 524, which is on the left hand side of FIG. 6, is realized as a classical three stage Dickson pump with n-channel transistors to generate a positive DC voltage offset with respect to the signal received at the dc input pin 522 (dc1). It will be appreciated that the auxiliary charge pump 532 can be configured to generate the required dc offset voltage from either the first differential input signal ill or the second differential input signal rf2.

The superposition of the output of the auxiliary charge pump 542 and the second differential input signal rf2 is provided by the n-type transistor 546. The three stage Dickson pump and the additional n-type transistor 546 may be considered together as a three and a half stage charge pump with its output connected to the gate of the first FET 524.

The same principle is applied to the auxiliary charge pump 534 for the second FET 526, and is shown on the right hand side of FIG. 6. In this case, the auxiliary charge pump is configured to generate a negative offset voltage with respect to the signal provided at the dc output pin 520 (dc2) and the superposition is performed by a p-type transistor instead of an n-type transistor.

It will be appreciated that either of the auxiliary charge pumps 532, 534 and either of the transistors that are used for superposing the dc offset voltages with the differential input signals can be realized with n- or p-type transistors, and also with more sophisticated circuits that may include components that can stabilize the DC output voltage as are known in the art.

One or more embodiments of the invention can use two 180° shifted input signals (rf1, rf2) from a differential chip input to control rectifying elements (for example transistors) such that during a conduction phase (p1) of the first input (rf1) the other phase of the second signal (rf2) is used to reduce the threshold voltage of a transistor, thereby reducing a voltage drop and therefore power losses at the transistor. During the reverse phase (p2) of the first input (rf1), the phase of the second signal (rf2) can be used to reduce the leakage current of the transistor, again providing a reduction in power loss at the transistor. The two 180° shifted signals can enable improved On/Off switching of the rectifying elements and therefore lead to a higher RF/DC power conversion efficiency.

One or more embodiments can be considered as providing a charge pump for UHF RFID devices that uses differential inputs to increase rectification efficiency by phase shifted switching.

It has been found that whereas prior art charge pumps in this field can provide efficiencies of the order of 35% (with optimal component values and settings), embodiments of the invention can provide efficiencies in excess of 50%, and this is before component and setting optimisation is performed.

The invention claimed is:

1. A sub-stage for a charge pump having a first and second phase of operation, the sub-stage comprising:
   a dc input pin;
   a dc output pin;
   a first radio frequency (rf) input pin configured to receive a first differential signal;
   a second rf input pin configured to receive a second differential signal;
   a first transistor having a first, second and third terminal, wherein a current channel is provided between the first and second terminals of the transistor; and
   a second transistor having a first, second and third terminal, wherein a current channel is provided between the first and second terminals of the transistor;
   wherein the first terminal of the first transistor is connected to the dc input pin, the second terminal of the first transistor is connected to the first terminal of the second transistor, and the second terminal of the second transistor is connected to the dc output pin;

wherein the first rf input pin is coupled to the second terminal of the first transistor and the first terminal of the second transistor, such that the current channel of the first transistor conducts signaling received at the first rf input pin during the first phase of operation, and the current channel of the second transistor conducts signaling received at the first rf input pin during the second phase of operation;

the sub-stage further comprising a first bias voltage source and a second bias voltage source;

wherein the third terminal of the first transistor is configured to receive the second differential signal from the second rf input pin and a first offset voltage signal from the first bias voltage source; and the third terminal of the second transistor is configured to receive the second differential signal from the second rf input pin and a second offset voltage signal from the second bias voltage source;

the first and second bias voltage sources being dc voltage sources;

the sub-stage being characterized in that the first bias voltage source is configured to provide the first offset voltage signal having a substantially constant value that is less than the threshold value of the first transistor, and the second bias voltage source is configured to provide the second offset voltage signal having a substantially constant value that is less than the threshold value of the second transistor, wherein the first and second differential signals are 180 degrees out of phase with each other.

2. The sub-stage of claim 1, wherein the second phase of operation is when signaling received at the first rf input pin is positive and signaling received at the second rf input pin is negative, and the first phase of operation is when signaling received at the first rf input pin is negative and signaling received at the second rf input pin is positive.

3. The sub-stage of claim 1, wherein the current channel of the first transistor is configured to not significantly conduct signaling received at the first rf input pin during the first phase of operation, and the current channel of the second transistor is configured to not significantly conduct signaling received at the first rf input pin during the second phase of operation.

4. The sub-stage of claim 1, wherein the first and second bias voltage sources are charge pumps.

5. The sub-stage of claim 1, wherein the first and second transistors are field effect transistors (FETs).

6. The sub-stage of claim 1, wherein the first transistor is an n-type field effect transistor and the second transistor is a p-type field effect transistor.

7. The sub-stage of claim 1, further comprising a first capacitor, wherein a first plate of the capacitor is coupled to the rf input pin and a second plate of the capacitor is coupled to the second terminal of the first transistor and the first terminal of the second transistor.

8. The sub-stage of claim 1, further comprising a second capacitor connected between the dc output pin and a dc node.

9. The sub-stage of claim 1, wherein the dc input pin is configured for connecting to a dc output pin of a preceding sub-stage if there is one, or is configured for connecting to a ground pin if there is no preceding sub-stage.

10. The sub-stage of claim 1, wherein the dc output pin is configured for connecting to a dc input pin of a next sub-stage if there is one, or is configured for connecting to a charge pump output pin there is no next sub-stage.

11. A charge pump having a first and second phase of operation, the charge pump comprising:

a first radio frequency (rf) input pin configured to receive a first differential signal;

a second rf input pin configured to receive a second differential signal;

an output pin;

a plurality of stages, each stage comprising:
  a first sub-stage and a second sub-stage,
  the first sub-stage comprising:
    a first dc input pin;
    a first dc output pin;
    a first transistor having first, second and third terminals, wherein a current channel is provided between the first and second terminals of the transistor; and
    a second transistor having first, second and third terminals, wherein a current channel is provided between the first and second terminals of the transistor;
    wherein the first terminal of the first transistor is connected to the first dc input pin, the second terminal of the first transistor is connected to the first terminal of the second transistor, and the second terminal of the second transistor is connected to the first dc output pin;
    wherein the first rf input pin is coupled to the second terminal of the first transistor and the first terminal of the second transistor, such that the current channel of the first transistor conducts signaling received at the first rf input pin during the first phase of operation, and the current channel of the second transistor conducts signaling received at the first rf input pin during the second phase of operation,
    the first sub-stage further comprising a first bias voltage source and a second bias voltage source;
    wherein the third terminal of the first transistor is configured to receive the second differential signal from the second rf input pin and a first offset voltage signal from the first bias voltage source; and
    the third terminal of the second transistor is configured to receive the second differential signal from the second rf input pin and a second offset voltage signal from the second bias voltage source;
  the second sub-stage comprising:
    a second dc input pin;
    a second dc output pin;
    a third transistor having first, second and third terminals, wherein a current channel is provided between the first and second terminals of the transistor; and
    a fourth transistor having a first, second and third terminals, wherein a current channel is provided between the first and second terminals of the transistor;
    wherein the first terminal of the third transistor is connected to the second dc input pin, the second terminal of the third transistor is connected to the first terminal of the fourth transistor, and the second terminal of the fourth transistor is connected to the second dc output pin;
    wherein the second rf input pin is coupled to the second terminal of the third transistor and the first terminal of the fourth transistor, such that the current channel of the third transistor conducts signaling received at the second rf input pin during the second phase of operation, and the current channel of the fourth transistor conducts signaling received at the second rf input pin during the first phase of operation, the second sub-stage further comprising a third bias voltage source and a fourth bias voltage source;

wherein the third terminal of the third transistor is configured to receive the first differential signal from the first rf input pin and a third offset voltage signal from the third bias voltage source; and the third terminal of the fourth transistor is configured to receive a first differential signal from the first rf input pin and a fourth offset voltage signal from the fourth bias voltage source;

wherein:

the dc input pins of the first and second sub-stages of a first stage are connected to ground, the dc output pins of the first and second sub-stages of a last stage are connected to the output pin, and the dc output pins of the first and second sub-stages of any other stages are connected to the dc input pins of the first and second sub-stages of the next stage.

12. A radio frequency identification device comprising the charge pump of claim 11.

13. A sub-stage for a charge pump having a first and second phase of operation, the sub-stage comprising:

a dc input pin;

a dc output pin;

a first radio frequency (rf) input pin configured to receive a first differential signal;

a second rf input pin configured to receive a second differential signal;

a first transistor having a first, second and third terminal, wherein a current channel is provided between the first and second terminals of the transistor; and a second transistor having a first, second and third terminal, wherein a current channel is provided between the first and second terminals of the transistor;

wherein the first terminal of the first transistor is connected to the dc input pin, the second terminal of the first transistor is connected to the first terminal of the second transistor, and the second terminal of the second transistor is connected to the dc output pin;

wherein the first rf input pin is coupled to the second terminal of the first transistor and the first terminal of the second transistor, such that the current channel of the first transistor conducts signaling received at the first rf input pin during the first phase of operation, and the current channel of the second transistor conducts signaling received at the first rf input pin during the second phase of operation;

the sub-stage further comprising a first bias voltage source and a second bias voltage source;

wherein the third terminal of the first transistor is configured to receive the second differential signal from the second rf input pin and a first offset voltage signal from the first bias voltage source; and the third terminal of the second transistor is configured to receive the second differential signal from the second rf input pin and a second offset voltage signal from the second bias voltage source;

the first and second bias voltage sources being dc voltage sources;

the sub-stage being characterized in that the first bias voltage source is configured to provide the first offset voltage signal having a substantially constant value that is less than the threshold value of the first transistor, and the second bias voltage source is configured to provide the second offset voltage signal having a substantially constant value that is less than the threshold value of the second transistor, wherein the sub-stage further comprising:

a second dc input pin;

a second dc output pin;

a third transistor and a fourth transistor, each of the third and fourth transistors having first, second and third terminals and being coupled to a corresponding bias voltage source, wherein a current channel is provided between the first and second terminals of the respective transistor, wherein the first terminal of the third transistor is connected to the second dc input pin, the second terminal of the third transistor is connected to the first terminal of the fourth transistor, and the second terminal of the fourth transistor is connected to the second dc output pin, wherein the second rf input pin is coupled to the second terminal of the third transistor and the first terminal of the fourth transistor, and wherein the third terminals of the third and fourth transistors are configured to receive the first differential signal from the first rf input pin and offset voltage signals from the corresponding bias voltage sources.

* * * * *